Dec. 3, 1940.    C. J. DAVIES    2,223,845
SUN VISOR
Filed Feb. 15, 1940
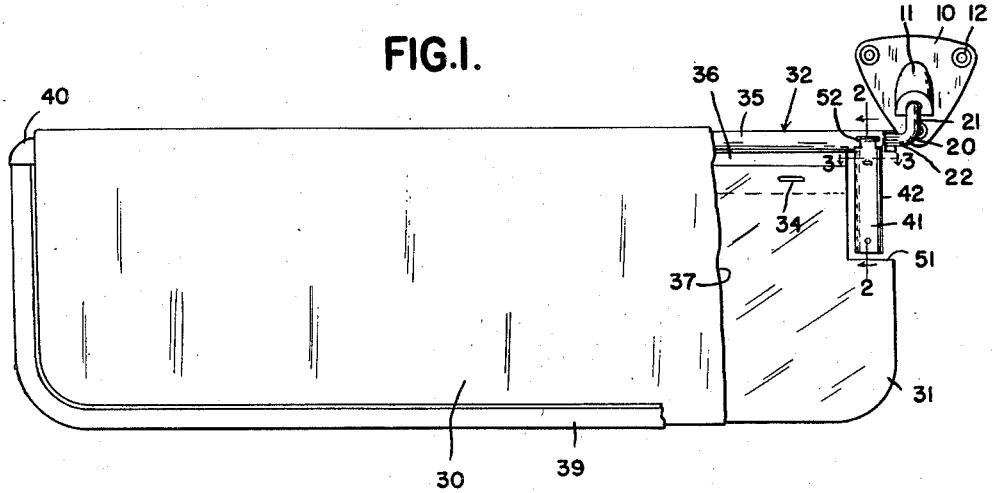
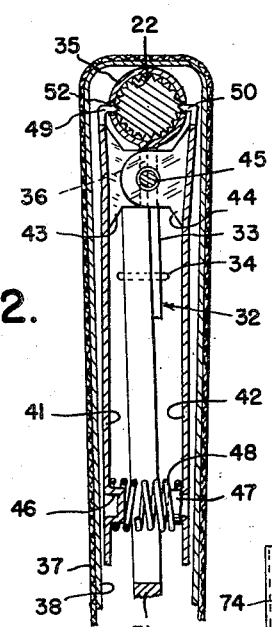
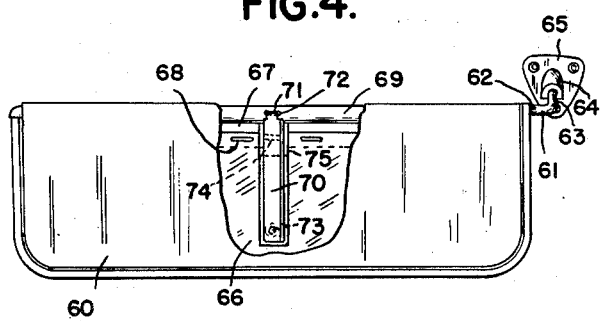
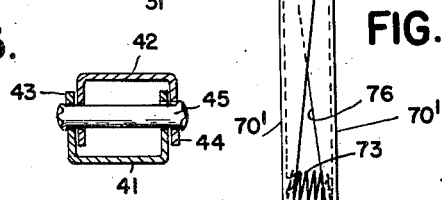
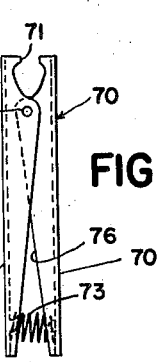
INVENTOR.
CLARENCE J. DAVIES
BY Whittemore, Hulbert
& Belknap ATTORNEYS Patented Dec. 3, 1940

2,223,845

UNITED STATES PATENT OFFICE 2,223,845

SUN VISOR

Clarence J. Davies, Detroit, Mich., assignor to National Automotive Fibres, Inc., Detroit, Mich., a corporation of Delaware Application February 15, 1940, Serial No. 319,119

15 Claims. (Cl. 296—97)

The present invention relates to a sun visor assembly and more particularly to a sun visor assembly which includes means for retaining the sun visor definitely in adjusted position.

At the present time many automotive vehicles are equipped with sun visors which comprise essentially a supporting rod mounted adjacent the top of the vehicle and an opaque glare shield or plate pivoted for movement about the rod; the rod itself may be mounted for swinging movement about a vertical axis so that the driver of the vehicle may position the glare shield at the front or at the side of the vehicle. In addition the glare shield may be adjustable along the rod. Sun visors of this type are provided with various means intended to retain the visor in adjusted position. Normally, when the visor is not in use, it is swung about the axis of the rod as a pivot so as to lie substantially parallel to the roof of the vehicle. Difficulty has been encountered in providing means which are at once efficient and economical for retaining the sun visor in adjusted position. Retaining means depending upon friction have proved definitely unsatisfactory for the reason that due to the vibration of the vehicle the visor element tends to drop down from its inoperative or horizontal position.

According to the present invention I have provided novel means which embodies latch mechanism for retaining the visor in definitely adjusted position. This means permits longitudinal adjustment of the glare shield along the supporting rod, and in addition is arranged so as to provide for ready manual release simply by gripping the glare shield or sun visor in the normal manner.

It is accordingly an object of the present invention to provide a novel sun visor assembly characterized by the provision of means for definitely retaining a sun visor in adjusted position about the axis of the supporting rod.

It is a further object of the present invention to provide a sun visor assembly characterized by manually releasable latch means for retaining the sun visor definitely in adjusted position.

It is a further object of the present invention to provide a sun visor having manually releasable latch means housed within the sun visor proper.

More specifically it is an object of the present invention to provide a sun visor assembly comprising a serrated rod in combination with a glare shield having spring pressed fingers engageable with the serrations on the rod, and manually releasable means for disengaging the fingers from the rod to permit adjustment of the glare shield about the axis of the rod and along the rod.

Other objects of the invention will be apparent as the description proceeds, and when taken in conjunction with the accompanying drawing wherein:

Figure 1 is a front elevation with parts broken away of my improved assembly;

Figure 2 is a section on the line 2—2, Figure 1;

Figure 3 is a section on the line 3—3, Figure 1;

Figure 4 is an elevation with parts broken away of a somewhat modified form of my invention; and Figure 5 is a detail view of the latch shown in Figure 4.

Referring first to Figure 1 the support for the assembly comprises a bracket 10 having an apertured ear 11 projecting therefrom. The bracket 10 is provided with apertures 12 for fastening the bracket to a suitable interior portion of the vehicle, as will be easily understood.

A supporting rod 20 having a portion 21 thereof bent at right angles is carried by the bracket 10 and supports the glare shield 30 for swinging movement about the axis of the rod 20 and for adjustment along the rod 20. The angularly bent portion of the rod 20 is received within the apertured ear 11 and preferably is mounted therein for swinging movement so that the sun visor may be adjusted to shield the operator from glare either ahead of the vehicle or at the sides of the vehicle. The bracket 10 forms no part of the present invention, and suitable brackets are at present on the market. Preferably these brackets include resilient or friction means which retain the rod 20 in adjusted position. The major portion of the rod 20 is provided with serrations indicated at 22, for a purpose which will subsequently appear.

The glare shield proper is indicated at 30 and comprises essentially a foundation plate 31 which may be heavy cardboard, such for example as Masonite. Secured along the upper edge of the board 31 is a metal member 32 which comprises a flat portion 33 fastened to the board 31 as by staple clips 34 or the like. The member 32 is formed into a tubular portion 35 adapted to receive the rod 20. The member 32 has an additional flat portion 36 which is parallel to the aforementioned flat portion 33, but which, as illustrated in Figure 2, preferably terminates above the upper edge of the board 31. The portions 36 and 33 of the metal member 32 may or may not be secured together as preferred.

In order to give the glare shield an attractive appearance and at the same time to conceal the mechanism which forms the subject matter of the present invention, I provide a cover therefor which comprises a paper and cloth envelope. As best seen in Figure 2, the cloth 37 is adhered to a paper cover 38. The cloth employed may be the same fabric as employed in the upholstery trim of the vehicle if desired. In order to attach the cloth and paper envelope over the board 31 and the metal member 32, I preferably employ binding tape 39. It will be appreciated that the paper and fabric envelope is of a size such that it may be folded over the top of the tubular portion 35 as seen in Figure 2, with the edges following the contour of the ends and bottom of the board 31. The tape 39 may then be sewed or otherwise secured to the fabric in a manner to retain the parts in assembled position. At 40 in Figure 1 I have indicated a metal corner reinforcement which serves to retain the end of the binding strip 39 against displacement.

In order to prevent accidental displacement of the visor 30 from adjusted position, I provide manually releasable latch means which cooperates with the serration 22 formed along the rod 20. This latch means takes the form of a pair of arms 41 and 42 having apertured ears 43 and 44 as illustrated in Figure 3. A pin 45 passes through the apertures in the ears 43 and 44 and pivots the arms 41 and 42 together. Adjacent the ends of the arms 41 and 42 opposite to the ears 43 and 44 I provide centering studs 46 and 47. As well illustrated in Figure 2 the arms 41 may conveniently be made of sheet metal stamped and bent to the desired form. The centering studs 46 and 47 may be struck inwardly from the arms 41 and 42, respectively. Between the arms 41 and 42 and retained in position between studs 46 and 47 I provide a coil compression spring 48 which tends to separate the arms at that point.

At the opposite ends of the arms 41 and 42 I provide fingers 49 and 50. These fingers are bent at right angles to the arms 41 and 42 and have their ends shaped to cooperate with the serrations 22 previously referred to. In Figure 2 I have illustrated the serrations as angular and the ends of the fingers 49 and 50 as provided with sharp knife edges engaging in the serrations.

The board 31, as best seen in Figure 1, is cut away as indicated at 51 to provide space for the latch mechanism just described. As will be evident from an inspection of Figure 2, outward movement of the arms 41 and 42 under the compulsion of the spring 48 is limited by engagement of the fingers 49 and 50 with the rod 20. By the reason of this outward displacement of the cloth and paper envelope of the sun visor is prevented.

The tube 32 is provided with a pair of diametrically opposed slots 52 through which the fingers 49 and 50 engage the rod 20. The slots 52 serve an additional function in locating and retaining in position the latch mechanism comprising the arms 41 and 42. As well illustrated in Figure 1, the latch mechanism is thus suspended from the tube 32 by the engagement of the fingers 49 and 50 in the slots 52.

As an alternative form the lower half of the tube 32, at one end thereof adjacent the latch mechanism, could be cut away and the latch mechanism could be retained in position by engagement of the ears 43 and 44 with a shoulder of the board 31. The preferred embodiment, however, is that illustrated which avoids the necessity of careful interfitting of parts.

It is to be understood that the paper and fabric cover which is shown cut away to disclose the latch mechanism completely conceals the latch mechanism in the complete article. In order to release the latch mechanism to adjust the sun visor on the rod 20, pressure is applied to the fabric envelope at opposite sides of the sun visor and at points overlying or substantially adjacent the ends of the arms 41 and 42. Preferably the envelope has a mark thereon at this point, such for example as the notice "press here for adjustment." It will be understood, of course, that the paper and fabric cover is light and easily displaced so that pressure applied thereto is effective to disengage the fingers 49 and 50 on the serrations on the rod 20.

In Figure 4 I have illustrated a somewhat different embodiment of my invention, which, however, embodies the same principles. According to this invention the latch mechanism is positioned in a position such that the portion thereof which is engaged by the operator is at the part of the visor which the operator ordinarily grips for effecting adjustment thereof.

In this figure I have illustrated the visor generally at 60. It is mounted on a rod 61 provided with serrations 62 and having an angularly bent portion 63 received within an apertured ear 64 of an attaching plate 65.

The structure of the visor proper is generally the same as that illustrated in Figure 1 and includes a main body 66 of board or the like secured to a metal member 67 as by means of rivets 68. The metal member 67 has a tubular portion 69 adapted to closely fit the rod 61. The latch indicated generally at 70 may be of the same construction as that shown in Figure 1. That is, it may comprise a pair of interpivoted arms 70' having angularly bent knife edged fingers at 71 which pass through openings 72 in the tube 69. Resilient means 73, such as a coil spring, urge the ends of the arms apart in a manner to cause the fingers to resiliently engage the serrations 62.

The arms 70' are pivotally interconnected by means of a pin 74. The frame 66 is provided with an aperture or cut away portion 75 to receive the latch 70. As seen in this figure the opening 75 is provided by cutting away the upper part of the board 66 and also a portion of the metal member 67 below the tubular portion 69 thereof. If preferred, the pivoted connection may be provided at a point further removed from the fingers 71 so that an opening in the board 66 is sufficient without cutting away any of the metal member 67.

This construction differs primarily from that shown in Figure 1 in a different location of the latch means 70. As will be observed, the arms making up the latch mechanism are somewhat longer than the arms 41 and 42 in the modification illustrated in Figure 1. By this arrangement the portion of the cover which is gripped in order to release the finger 71 from the serrations is located toward the central portion of the visor 60 and adjacent the lower edge thereof. As will be recognized, this is the portion of the visor which is ordinarily gripped by the operator in effecting adjustment thereof.

In both modifications the location of the pivot connection between the latch arms is such that when the arms are pressed into engagement with each other the fingers passing through the slots in the tubular member will not be fully withdrawn from the slots.

It will further be noted that the adjustment of the visor may be effected readily with one hand. As a matter of fact the operator grips the visor in substantially the same manner as he would if the latch mechanism were not employed. It is then necessary only to apply moderate pressure to the envelope at or adjacent the marked point to disengage the fingers from the serrations.

It will further be observed that the present latch mechanism is effective to retain the visor in adjusted position in any longitudinal position of adjustment of the visor. Thus for example the serrations 22 are preferably provided for a substantial length along the rod 20, the length being at least the length of desired longitudinal adjustment of the visor 30 thereon. The visor may be adjusted longitudinally on the rod 20 without releasing the latch mechanism if desired, in which case the fingers 49 and 50 will merely slide along the corresponding serration. In this case they will provide a frictional resistance against longitudinal displacement. If preferred, of course, the latch mechanism may be completely released so that longitudinal sliding on the rod will be facilitated.

It will further be observed that even though the operator disregards instructions to manually release the latch before swinging the visor 30 about the rod 20, no damage to the parts will result. Swinging movement without manual release of the latch will merely result in a sliding of the fingers 49 and 50 over the serrated surface of the rod. This, if continued over long periods will of course tend to wear away the knife edges of the fingers 49 and 50, and the sharp points on the serrations 22, but since these parts are designed to interfit they will be effective to retain the visor in adjusted position even if improper adjustment is long continued.

The latch comprising arms 41 and 42 and the latch 70 may be made very cheaply by forming identical stampings, and the parts assembled by positioning the ear at one side of one arm outside the corresponding ear of the other arm, and the ear at the opposite side of the first arm inside the corresponding ear of the other arm.

In the modification of Figures 4 and 5, arms 79' are preferably stiffened by providing the angularly bent flanges 76 seen in Figure 5.

While I have illustrated preferred forms of my invention, certain modifications thereof will at once be apparent to those skilled in the art. For example, instead of employing a pair of interpivoted arms 41 and 42 substantially the same result could be obtained with a single arm mounted for example on the board 31.

One of the important aspects of the present invention is the extreme simplicity of the same and the fact that it may be embodied in visors commonly used at the present time without materially modifying the present structure. In addition, the present invention is characterized by the extreme economy with which the parts may be manufactured and assembled.

It will be observed that the latch means if desired could be located outside the envelope, as for example at one end thereof. Its functional utility would be the same, but it would be less desirable commercially as detracting from the appearance of the article.

While I have illustrated my invention as applied to a conventional opaque sun visor of the type commonly employed at the present time, it will be readily apparent that the same is equally adaptable for use in conjunction with transparent glare shields, such for example as colored glass or transparent polarizing material.

While I have illustrated and described a single preferred form of my invention, it will be understood that this has been done solely to enable those skilled in the art to practice the invention, the scope of which is indicated by the appended claims.

What I claim as my invention is:

1. A sun visor comprising a flat shield, a support therefor on which said shield is swingably mounted, and manually releasable latch means housed within said shield engageable with said support, said latch means including a spring pressed finger, operable by pressure on said shield.

2. A supporting rod having longitudinal serrations, a flat plate pivoted to said rod, a latch carried by said plate having a finger resiliently engaging said serrations, means for releasing said finger from said serrations to permit adjustment of said plate, and a fabric cover concealing said plate and latch, said means being actuatable through said fabric.

3. A supporting rod having longitudinal serrations, a flat plate pivoted to said rod, a latch carried by said plate having a movable arm carried by said plate, one end of said arm having a finger engageable with said serrations, a fabric cover concealing said plate and said latch, the other end of said arm being engageable by an operator through said fabric cover to release said plate for adjustment about said rod.

4. A supporting rod having longitudinal serrations, a flat plate pivoted to said rod, a latch carried by said plate having a pair of pivoted arms carried by said plate, one end of each of said arms having a finger engageable with said serrations, a fabric cover concealing said plate and said latch, the other ends of said arms being movable toward each other by pressure manually applied through said fabric cover to release said fingers from said serrations.

5. A sun visor assembly comprising a rod, a flat shield slidable along said rod and adjustable around said rod, manually releasable latch means carried by said shield and engageable with said rod in any position of adjustment, and a fabric cover concealing said shield and latch means, said latch means being manually actuatable through said fabric cover.

6. A sun visor assembly comprising a rod, a flat shield having a tubular portion slidable along and about said rod, said rod provided with longitudinally extending serrations, a pair of arms pivoted together and carried by said shield, said arms having ends cooperating with said serrations to retain said shield against rotation, resilient means urging said ends of said arms into engagement with said rod, the opposite ends of said arms being manually movable towards each other to release said ends of said arms from said rod.

7. A sun visor assembly comprising a rod, a flat shield having a tubular portion slidable along and about said rod, said rod provided with longitudinally extending serrations, a pair of arms pivoted together and carried by said shield, said arms having ends cooperating with said serrations to retain said shield against rotation, resilient means urging said ends of said arms into engagement with said rod, the opposite ends of said arms being manually movable towards each other to release said ends of said arms from said rod, and a fabric cover for said shield concealing said shield and said arms, said arms being manually actuatable through said fabric cover.

8. A sun visor assembly comprising a rod, a flat shield having a tubular portion slidable along and about said rod, said rod provided with longitudinally extending serrations, said tubular portion having a lateral opening therein, a latch carried by said shield having a finger extending through said opening and engageable with said serrations, resilient means urging said finger into engagement with said serrations, said latch being manually movable against said resilient means to release said finger from said serrations.

9. A sun visor assembly comprising a rod, a flat shield having a tubular portion slidable along and about said rod, said rod provided with longitudinally extending serrations, said tubular portion having a lateral opening therein, a latch carried by said shield having a finger extending through said opening and engageable with said serrations, resilient means urging said finger into engagement with said serrations, said latch being manually movable against said resilient means to release said finger from said serrations, and a fabric cover concealing said shield and said latch, said latch being actuatable through said fabric cover.

10. A sun visor assembly comprising a rod, a flat shield having a tubular portion slidable along and about said rod, said rod provided with longitudinally extending serrations, said tubular portion having opposed lateral opening therethrough, a latch comprising a pair of arms pivoted together and having opposed fingers movable through said openings into engagement with said serrations and resilient means pivotally urging said arms in a direction to cause said fingers to engage said serrations.

11. A sun visor assembly comprising a rod, a flat shield having a tubular portion slidable along and about said rod, said rod provided with longitudinally extending serrations, said tubular portion having opposed lateral openings therethrough, a latch comprising a pair of arms pivoted together and having opposed fingers movable through said openings into engagement with said serrations and resilient means pivotally urging said arms in a direction to cause said fingers to engage said serrations, said arms being positioned so as to be engaged by the fingers of an operator to pivot said arms in a direction to release said fingers from said serrations.

12. A sun visor assembly comprising a rod, a flat shield having a tubular portion slidable along and about said rod, said rod provided with longitudinally extending serrations, said tubular portion having opposed lateral openings therethrough, a latch comprising a pair of arms pivoted together and having opposed fingers movable through said openings into engagement with said serrations and resilient means pivotally urging said arms in a direction to cause said fingers to engage said serrations, said arms being positioned so as to be engaged by the fingers of an operator to pivot said arms in a direction to release said fingers from said serrations, a fabric cover concealing said shield and said latch.

13. A sun visor assembly comprising a rod, a flat shield having a tubular portion slidable along and about said rod, said rod provided with longitudinally extending serrations, said tubular portion having opposed lateral openings therethrough, a latch comprising a pair of arms pivoted together and having opposed fingers movable through said openings into engagement with said serrations and resilient means pivotally urging said arms in a direction to cause said fingers to engage said serrations, aid arm being positioned so as to be engaged by the fingers of an operator to pivot said arms in a direction to release said fingers from said serrations, said latch being carried by said shield and positioned thereon by engagement of said fingers in said openings.

14. A supporting rod having longitudinal serrations, a flat plate pivoted to said rod, a latch carried by said plate having a finger resiliently engaging said serrations, means for releasing said finger from said serrations to permit adjustment of said plate, and a fabric cover concealing said plate and latch, said means being actuatable through said fabric and being located adjacent the free edge of said plate adjacent the mid portion thereof.

15. A sun visor assembly comprising a rod, a flat shield having a tubular portion slidable along and about said rod, said rod provided with longitudinally extending serrations, said tubular portion having opposed lateral openings therethrough, a latch comprising a pair of arms pivoted together and having opposed fingers movable through said openings into engagement with said serrations and resilient means pivotally urging said arms in a direction to cause said fingers to engage said serrations, said shield being cut away to provide space in the plane thereof for said latch.

CLARENCE J. DAVIES.